Aug. 25, 1953      H. H. STRONG      2,650,292
LAMP HAVING A REFLECTOR, TWO LENSES, AND
MEANS TO VARY THE DISTANCE BETWEEN THEM
Filed July 12, 1949      3 Sheets-Sheet 1
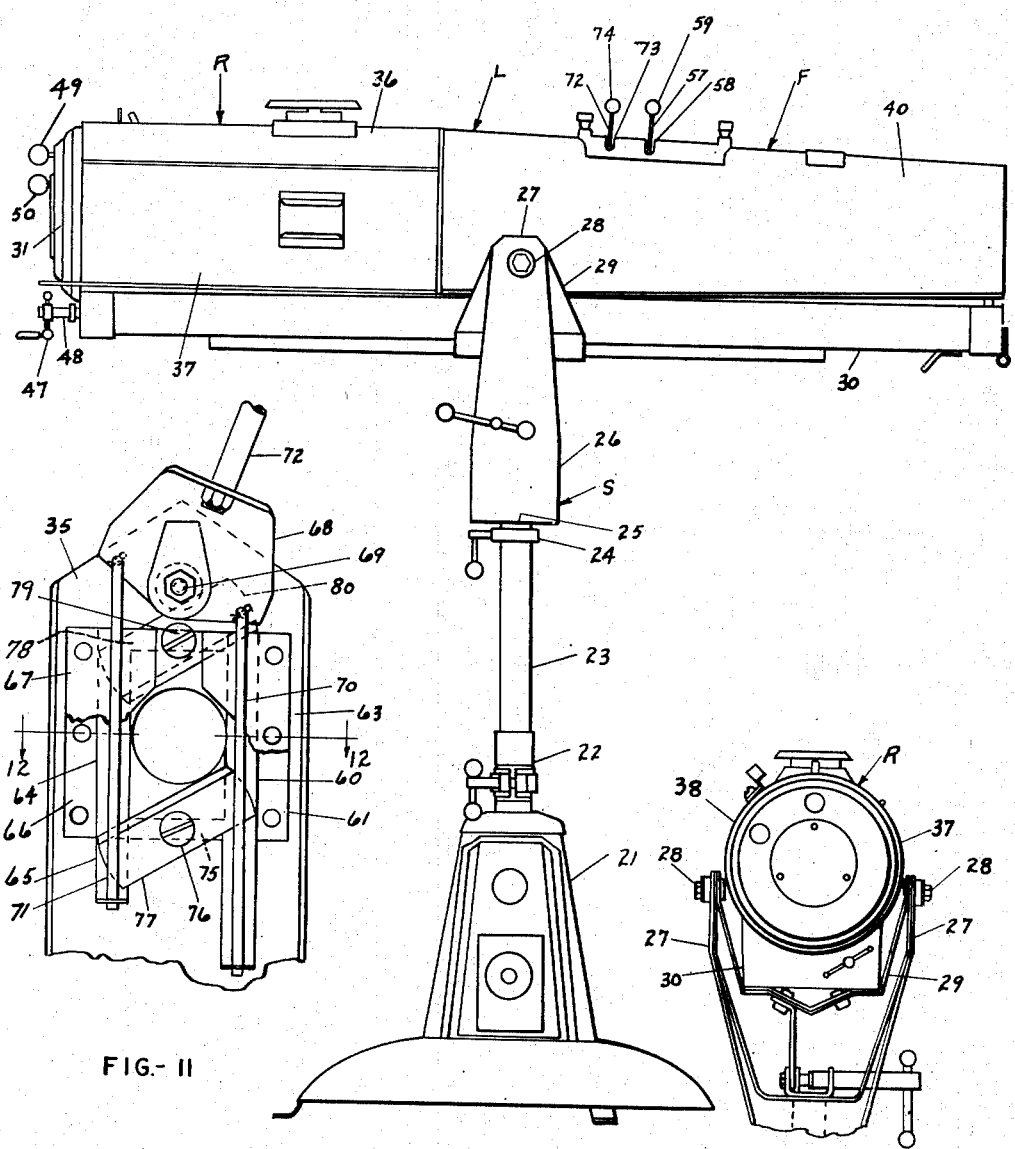
FIG.-11      FIG.-1      FIG.-3
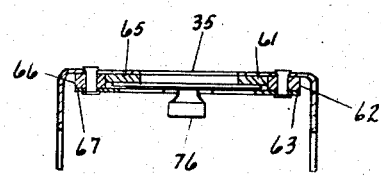
FIG.-12
HARRY H. STRONG
INVENTOR
BY
ATTORNEY

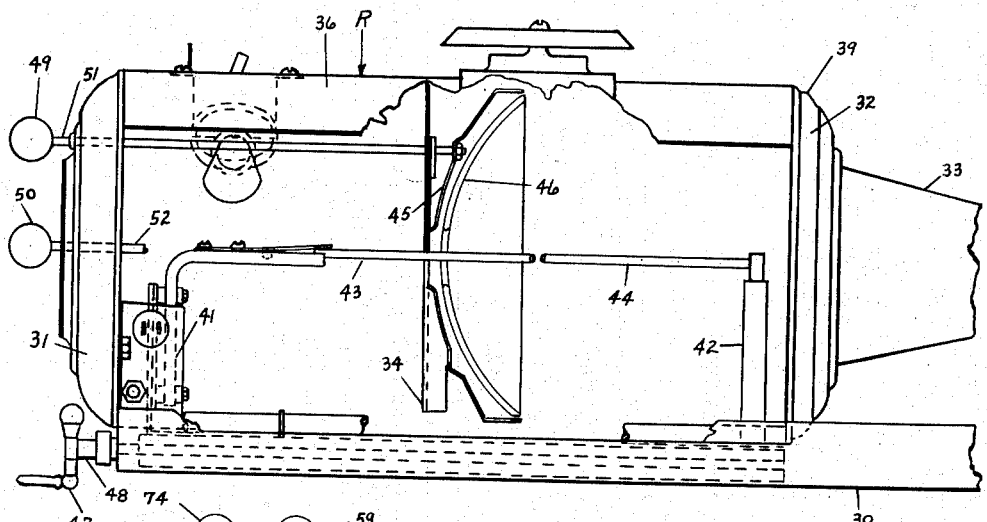
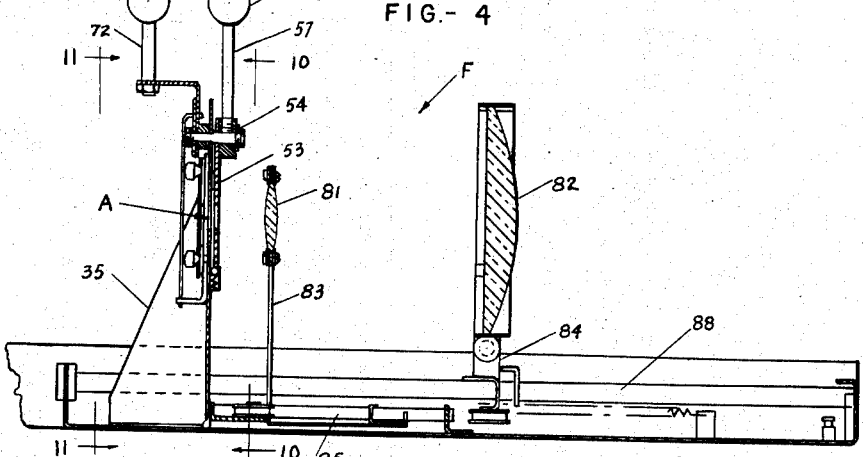
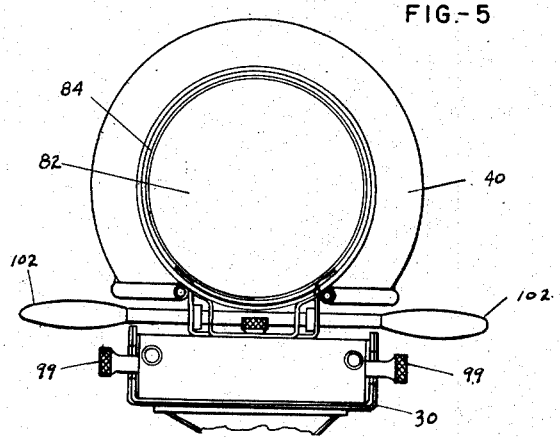

Aug. 25, 1953 H. H. STRONG 2,650,292
LAMP HAVING A REFLECTOR, TWO LENSES, AND
MEANS TO VARY THE DISTANCE BETWEEN THEM
Filed July 12, 1949 3 Sheets-Sheet 3
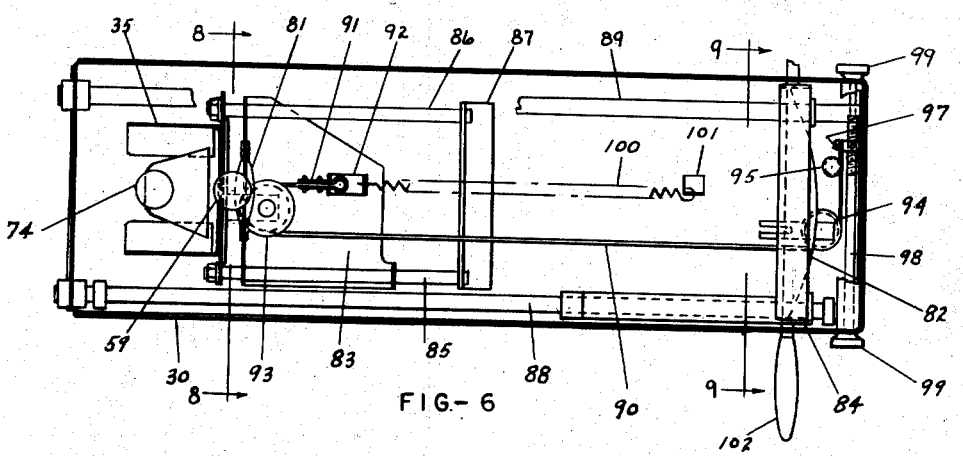
FIG.-6
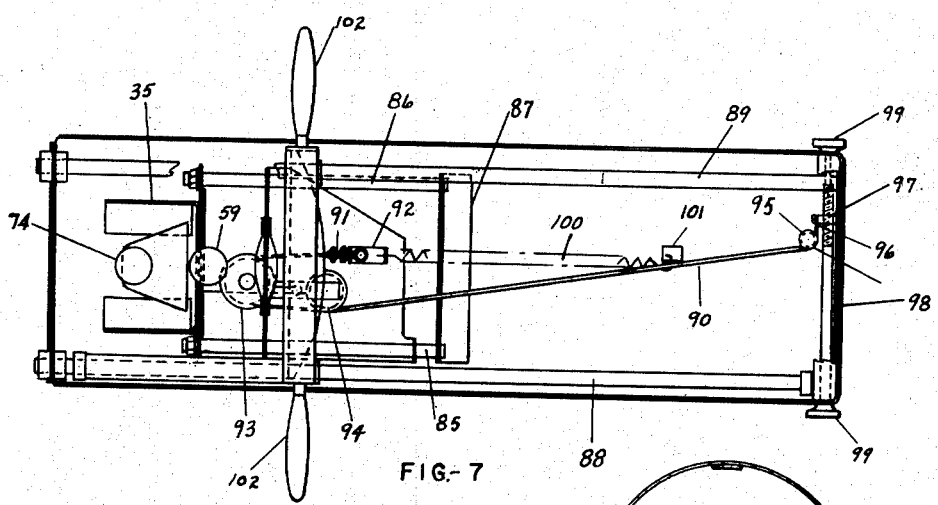
FIG.-7
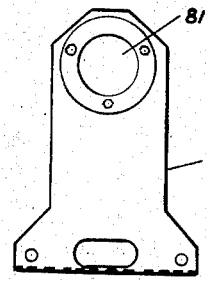
FIG.-8
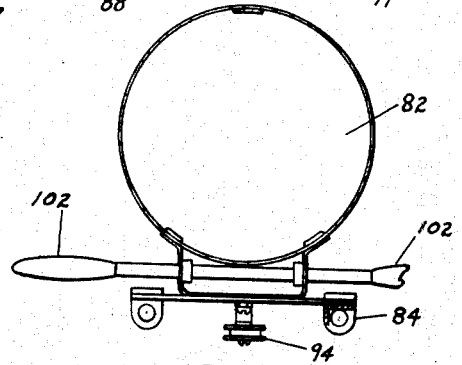
FIG.-9
HARRY H. STRONG
INVENTOR
BY 
ATTORNEY Patented Aug. 25, 1953

2,650,292

UNITED STATES PATENT OFFICE 2,650,292

LAMP HAVING A REFLECTOR, TWO LENSES, AND MEANS TO VARY THE DISTANCE BETWEEN THEM

Harry H. Strong, Toledo, Ohio, assignor to The Strong Electric Corporation, Toledo, Ohio, a corporation of Ohio Application July 12, 1949, Serial No. 104,159

7 Claims. (Cl. 240—3)

My invention relates to lamps, and particularly to lamps for projecting a spot or beam of light, and the principal object of my invention is to provide a new and improved lamp particularly for that purpose.

In the present embodiment, light from a suitable source, such as an electric arc, is projected by means of an optical system comprising a focusing reflector and two successive lenses adjustable to produce a beam of proper focus considering particularly the distance to the area to be illuminated.

As is understood by those skilled in the art, provision of a proper beam under the various adjustments requires not only variation in the distance between the two lenses, but also corresponding variation in the distance between the reflector and the first of the lenses, and therefore, in the situation where the reflector is essentially stationary, movements of both of the lenses, and in predetermined varying ratio.

A particular purpose of my invention is to provide improved means for suitably accomplishing such movements of the lenses; and another purpose of my invention is to provide means for varying the cross-section of the projected beam.

In the drawings accompanying this specification and forming a part of this application I have shown, for purposes of illustration, what I now consider to be the best mode of carrying my invention into practice, and in these drawings:

Figure 1 is a side elevation of the illustrative embodiment of my invention;

Figures 2 and 3 are respectively front and rear elevations, but omitting the lower portions of the supporting stand;

Figures 4 and 5 are enlarged side views of respectively the rear and front portion of the lamp unit with the door of the rear casing open, the front casing removed, and certain parts in vertical section;

Figures 6 and 7 are plan views of the front portion of the lamp unit showing particularly the mechanism interconnecting the two lens units, and showing the lens units respectively in their extreme spaced and extreme approached positions;

Figures 8 and 9 are elevational views on the lines 8—8 and 9—9 of Figure 6, showing respectively the front and rear lens units; and Figures 10, 11, and 12 are views on the lines 10—10 and 11—11 of Figure 5, and on the line 12—12 of Figure 11, showing particularly the aperture unit.

The present embodiment of my invention comprises a lamp unit L supported by a stand S comprising a base 21 provided at its upper end with a clamp 22 in which is adjustably mounted a column 23 having at its upper end a clamp 24 in which is adjustably mounted a stud 25 carrying a fork 26 provided adjacent its free ends 27 with trunnions 28 on which is pivotally mounted a cradle 29 in which is fixed the base channel 30 of the lamp unit L.

Fixedly mounted on the base channel 30 are a rear end plate 31 constituting the closure for the rear end of the lamp housing, and a partition 32 dividing the lamp unit L into a rear section R and a front section F but comprising a conical tube 33 affording an opening from the one section to the other, and relatively fixedly mounted on the base channel 30 are a reflector support 34 located in the rear portion R, and an aperture support 35 located in the front section F.

Carried by the end plate 31 and partition 32 is a top housing member 36 to the longitudinal edges of which are pivoted side housing members 37 and 38 serving to complete the housing of the rear section R, and carried on a shoulder 39 of the partition 32 is a conical tube 40 constituting the housing of the front section F.

Reciprocally mounted on longitudinal rods supported by the base channel 30 are rear and front electrode carriers 41 and 42 carrying rear and front electrodes 43 and 44, and universally pivotally mounted on the reflector support 34 is a reflector carrier 45 carrying a reflector 46 disposed in appropriate relation to the arc produced between the electrodes 43 and 44.

In the present embodiment the electrodes 43 and 44 are fed by rotation of a crank 47 located rearwardly of the end plate 31 and actuating a shaft 48 operating through screw mechanism to effect opposite movements of the electrode carriers 41 and 42 in a manner well known in the art, and the angular position of the reflector may be adjusted by means of reciprocable rods 51 and 52 connected at their forward ends to the reflector carrier 45 and conveniently operated by terminal knobs 49 and 50 located rearwardly of the end plate 31.

Thus the reflector 46 may be appropriately positioned to direct the light axially of the conical tube 33 of the partition 32, and in the present embodiment this results automatically in suitably directing the light axially through a light aperture A in the aperture support 35 and thence to the successive lenses 81 and 82.

According to the present construction these rear and front lenses 81 and 82 are carried by rear and front lens carriers 83 and 84, and to provide the desired adjustability of the lenses the carriers 83 and 84 are longitudinally reciprocally mounted respectively on rods 85 and 86 supported by a bracket 87 carried by the base channel 30, and on rods 88 and 89 carried directly by the base channel 30.

Similarly, to provide the desired simultaneous movement of the lenses, in inverse directions and in varying ratio, interconnecting the lens carriers 83 and 84 is a strap 90 connected at its one end 91 to a fitting 92 secured to the rear lens carrier 83, passing over a fixed pulley 93 mounted on the base channel 30, a second pulley 94 mounted on the front lens carrier 84, and a further fixed pulley 95 supported on the base channel 30, and secured at its other end 96 to an abutment 97 adjustably mounted to provide for initial adjustment of the relative positions of the lenses 81 and 82.

In the present embodiment the abutment 97 therefore is screw-threadedly carried on a transverse shaft 98 rotatably mounted in the forward end of the flanges of the base channel 30 and conveniently rotated by means of terminal knobs 99, the strap 90 is maintained against slack by means of a tension spring 100 extending between the fitting 92 of the rear lens carrier 83 and an attachment 101 struck from the base channel 30, and the lenses are conveniently moved by means of handles 102 extending laterally from the front lens carrier 84.

Thus movement of the front lens 82 by means of either of the handles 102, by reason of the strap 90 and the arrangement of the strap 90 and its associated pulleys, automatically will result in movement of the rear lens 81 in the inverse direction and to the proper extent, whereby over the entire range of adjustment of the spread of the beam, from the one extreme indicated in Figure 6 to the other extreme indicated in Figure 7, the lenses and the reflector continually will be maintained in correct optical relation.

However, particularly with the range of adjustment herein indicated, it is desirable that means be provided to vary the size of the light aperture, and accordingly the present embodiment includes means for that purpose, shown particularly in Figure 10, and in the present embodiment comprising a plate 53 pivoted to the aperture support 35 at 54, provided with large and small apertures 55 and 56 either of which may be brought into operative position merely by pivotal movement of the plate 53, and conveniently operated by means of a lever 57 secured to the plate 53 and extending through a slot 58 in the front section housing 40 and desirably provided with a suitable knob 59.

On the other hand, the present embodiment includes also means for varying the shape of the beam, shown particularly in Figures 11 and 12, and in the present form comprising a T-shape member 60 vertically reciprocally mounted by disposition of its head 61 in a slideway formed by the aperture support 35 and a spacing bar 62 and a plate 63 riveted or otherwise suitably secured to the support 35, an inverted L-shape member 64 vertically reciprocally mounted by disposition of its vertical arm 65 in a slideway formed by the aperture support 35 and a spacing bar 66 and a plate 67 riveted or otherwise suitably secured to the support 35, an angularly adjustable lower cut-off plate 77 pivotally supported on a pin 76 carried by the stem 75 of the T-shape member 60, and an angularly adjustable upper cut-off plate 80 pivotally supported on a pin 79 carried by the horizontal arm 78 of the inverted L-shape member 64.

With the above the present means for varying the shape of the beam includes also mechanism for simultaneously vertically reciprocating the members 60 and 64 in inverse directions, and thereby simultaneously vertically translating the cut-off plates 77 and 80 in inverse directions, herein shown as comprising a plate 68 pivoted on a pin 69 carried by the aperture support 35, rods 70 and 71 connecting from the members 60 and 64 to opposite lateral portions of the plate 68, and an operating lever 72 extending from the plate 68 through a slot 73 in the front section housing 40 and provided for convenience with an operating knob 74, whereby simple operation of the lever 72 results in restrictively varying the shape of the beam, according to the space remaining between the cut-off plates 77 and 80, determined by the angular position to which the plates 77 and 80 have been previously adjusted and by the extent of movement of the lever 72 and consequent extent of translation of the plates 77 and 80.

From the foregoing it will be apparent to those skilled in the art, that the particular embodiment of my invention herein shown and described in any event accomplishes at least the principal objects of my invention.

On the other hand, also it will be apparent to those skilled in the art, that the present embodiment of my invention accomplishes advantages other than those specifically indicated, and further, that various changes and modifications may be made without sacrificing any or all of the various advantages, and therefore it is to be understood that the particular embodiment herein shown and described is presented for purposes of illustration, and my invention is to be regarded as defined by my claims.

Wherefore I claim:

1. In a light-projecting apparatus, a support, means for establishing a beam of light including a light source; a pair of relatively movable lenses arranged in the path of the beam of light; a carrier for each of said lenses movable upon the support axially of the light beam; a flexible member; means for anchoring the member to the support; means connecting the flexible member to one of the lens carriers; an element carried by the support; said flexible member engaging and passing over said element; means for maintaining tension in said flexible element, and means mounted on the other of said carriers engageable with the flexible member for varyingly deflecting the flexible member during relative movement of one of said carriers to concomitantly effect movement of the other carrier at a different speed in a reverse direction.

2. In a light-projecting apparatus, a support, means for establishing a beam of light including a light source; a pair of relatively movable lenses arranged in the path of the beam of light; a carrier for each of said lenses mounted upon and movable relative to the support; a flexible member; means anchoring one end of the member to the support; an element mounted upon the support; said flexible member being retroflexed around the element and having its other end connected to one of said lens carriers; means on the other of said lens carriers engaging the flexible element whereby movement of said latter mentioned carrier deflects said flexible member to cause relative movement of the other lens carrier in the opposite direction, and yieldable means for biasing said carriers toward an initial position.

3. In a light-projecting apparatus, a support, means for establishing a beam of light including a light source; a pair of relatively movable lenses arranged in the path of the beam of light; a carrier for each of said lenses mounted upon and movable relative to the support in directions axially of the beam of light; a flexible member; means anchoring one end of the member to the support; means for adjusting the anchoring means relative to the support; an element mounted upon the support; said flexible member being retroflexed around the element and having its other end connected to one of said lens carriers; means on the other of said lens carriers engaging the flexible element whereby movement of said latter mentioned carrier deflects said flexible member to cause relative movement of the other lens carrier in the opposite direction, and yieldable means for maintaining tension in said flexible member.

4. In a light-projecting apparatus, a support, means for establishing a beam of light including a light source; a pair of relatively movable lenses arranged in the path of the beam of light; a carrier for each of said lenses mounted upon and movable relative to the support; a flexible member; means for anchoring one end of the flexible member to the support; means for anchoring the other end of the flexible member to one of said lens carriers; one of said anchoring means being adjustable to initially position the lens carriers; an element mounted upon the support; said flexible member being retroflexed around said element; means on said other lens carrier engageable with the flexible member for varyingly deflecting the flexible member to cause relative movement of the first mentioned lens carrier in the opposite direction at a different speed, and means for biasing the lens carriers toward an initial position.

5. In a light-projecting apparatus, a support, means for establishing a beam of light including a light source; a pair of relatively movable lenses arranged in the path of the beam of light; a carrier for each of said lenses mounted upon and movable relative to the support; a flexible cable; means for securing the cable to the support and to one of the lens carriers; guide means for confining movement of the lens carriers longitudinally of the light beam, a pulley journalled upon the support, said cable being retroflexed around the pulley; a pulley journalled upon the other of said lens carriers and engaging the cable whereby longitudinal movement of the pulley-bearing carrier varyingly deflects the cable causing movement of the first mentioned lens carrier in the opposite direction at a different speed ratio for varying the characteristics of the light beam, and resilient means for maintaining tension upon the cable.

6. Apparatus for producing a spot or beam of light, comprising means including a light source arranged to produce a beam of light, a first lens disposed to receive said beam and to project a consequent beam, a second lens disposed to receive said consequent beam and to project a resulting beam, a relatively movable carrier for each of said lenses, means for adjusting the carriers longitudinally of the light course, thereby to vary the spread of the resulting beam, said adjusting means including a flexible cable, relatively stationary cable attachment means for anchoring one end of said cable, a second cable attachment means connecting the cable to one of the carriers, relatively stationary cable guiding means mounted beyond said second attachment means, said cable engaging said guide means, means on the other of said lens carriers engaging the flexible cable whereby movement of said latter-mentioned carrier deflects said flexible cable to cause relative movement of the other lens carrier in the opposite direction, and means for maintaining tension in the flexible cable.

7. An optical mechanism comprising two successive lenses, a support, a light source; means including a relatively movable carrier supporting each of said lenses to permit relative movement of said lenses longitudinally of the light course therebetween, motion-transmitting means connecting said lenses whereby movement of one of said lenses longitudinally of said light course will cause movement of the other of said lenses longitudinally of said light course in the direction and to an extent to maintain substantially a desired optical relation, said motion-transmitting means including a flexible cable; relatively stationary cable attachment means for anchoring the cable; second cable attachment means connecting the cable to one of said lens carriers; an element mounted upon the support beyond said second attachment means, said cable being retroflexed round the element, means on the other of said carriers engaging the flexible element whereby movement of the latter-mentioned carrier deflects the flexible cable to cause relative movement of the other lens carrier in the opposite direction at a different speed, and means for maintaining said cable in tension.

HARRY H. STRONG.

References Cited in the file of this patent

UNITED STATES PATENTS

| Number | Name | Date |
|---|---|---|
| 1,709,626 | McGunnigle | Apr. 16, 1929 |
| 1,737,993 | Bowen | Dec. 3, 1929 |
| 1,755,105 | Douglass | Apr. 15, 1930 |
| 1,898,471 | Walker | Feb. 21, 1933 |
| 1,950,166 | Durholz | Mar. 6, 1934 |
| 1,988,390 | Naumann | Jan. 15, 1935 |
| 2,076,240 | Levy | Apr. 6, 1937 |
| 2,347,771 | Dion et al. | May 2, 1944 |
| 2,356,620 | Schade | Aug. 22, 1944 |
| 2,425,863 | Carlson | Aug. 19, 1947 |